United States Patent
Maloney et al.

(10) Patent No.: US 9,250,767 B2
(45) Date of Patent: Feb. 2, 2016

(54) PROVIDING THEME VARIATIONS IN A USER INTERFACE

(75) Inventors: Christopher Michael Maloney, San Francisco, CA (US); Muhammad Asim Goheer, Morgan Hill, CA (US); Onur Onder, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 616 days.

(21) Appl. No.: 13/539,537

(22) Filed: Jul. 2, 2012

(65) Prior Publication Data

US 2013/0239002 A1    Sep. 12, 2013

Related U.S. Application Data

(63) Continuation of application No. 13/417,325, filed on Mar. 12, 2012.

(51) Int. Cl.

| G06F 17/21 | (2006.01) |
|---|---|
| G06T 11/60 | (2006.01) |
| G06F 17/24 | (2006.01) |
| G06F 3/0482 | (2013.01) |

(52) U.S. Cl.
CPC ............ *G06F 3/0482* (2013.01); *G06F 17/211* (2013.01); *G06F 17/248* (2013.01); *G06T 11/60* (2013.01)

(58) Field of Classification Search
CPC .............................. G06F 17/211; G06F 17/248
USPC ......................................................... 715/732
See application file for complete search history.

(56) References Cited

U.S. PATENT DOCUMENTS

| 7,028,262 | B2 | 4/2006 | Estrada et al. |
|---|---|---|---|
| 7,607,089 | B2 | 10/2009 | Baker et al. |
| 8,201,092 | B2 | 6/2012 | de Leon et al. |
| 8,296,658 | B2 | 10/2012 | Kaplan et al. |
| 2005/0278625 | A1 | 12/2005 | Wessling et al. |
| 2007/0162855 | A1 | 7/2007 | Hawk et al. |
| 2009/0282085 | A1 | 11/2009 | Billard et al. |
| 2010/0042926 | A1 | 2/2010 | Bull et al. |

(Continued)

OTHER PUBLICATIONS

How to Configure Aspect Ratio of PowerPoint Animantion Video Feb. 14, 2011 8 pages.*

(Continued)

*Primary Examiner* — Andrea Long
(74) *Attorney, Agent, or Firm* — Steve Crocker; Danielle Johnston-Holmes; Micky Minhas

(57) ABSTRACT

A presentation program provides a graphical user interface that includes a theme gallery and a theme variation gallery. Users can apply a theme to a slide by selecting a theme thumbnail image. Once selected, a corresponding set of theme variations are indicated in the theme variation gallery using theme variation thumbnail images. Users can apply the desired theme variation by selecting the theme variation thumbnail image. Once selected, the theme variation is applied to the slide. A theme variation family identifier is stored in the slide file that allows subsequent identification of the theme, and allows a presentation program to subsequently identify theme variations for display on the theme variation gallery. A file structure is identified that allows backwards compatibility so that a presentation file of a slide with theme variations can be opened by an earlier version of a presentation program that does not implement theme variations.

20 Claims, 9 Drawing Sheets

(56) References Cited

U.S. PATENT DOCUMENTS

| | | |
|---|---|---|
| 2010/0153839 A1 | 6/2010 | Wilkins |
| 2011/0072376 A1 | 3/2011 | Moore et al. |
| 2012/0057052 A1 | 3/2012 | Georgis et al. |
| 2013/0239001 A1 | 9/2013 | Maloney et al. |

OTHER PUBLICATIONS

Keep the Formatting of an Inserted Slide in PowerPoint Apr. 25, 2009 11 pages.*
PowerPoint 2007 Themes and Background Styles Nov. 15, 2010 10 pages.*
Derek Schauland Take advantage of slide resuse in PowerPoint presentations Sep. 9, 2009 8 pages.*
"Design Slides with PowerPoint Theme," Dummies.com, Mar. 10, 2009, http://web.archive.org/web/20090310124550/http://www.dummies.com/how-to/content/design-slides-with-powerpoint-themes.html, 3 pages.
"What is a theme?" Microsoft Office PowerPoint, Jan. 12, 2011, http://web.archive.org/web/20110112223628/http://office.microsoft.com/en-us/powerpoint-help/what-is-a-theme-HA010338417.aspx, 8 pages.
"Apply a Theme to add color and Style to your presentation," Microsoft Office PowerPoint, Oct. 16, 2010, http://web.archive.org . . . http://office.microsoft.com/en-us/powerpoint-help/apply-a-theme-to-add-and-style-to-your-presentation-HA010336493.aspx, 2 pages.
U.S. Official Action dated Jun. 28, 2013 in U.S. Appl. No. 13/417,325.
U.S. Official Action dated Jan. 31, 2014 in U.S. Appl. No. 13/417,325.
"Power Point 2007: Themes and Background Styles," Published on: Mar. 18, 2011; Available at: https://web.archive.org/web/20110318100018/http://www.gcflearnfree.org/powerpoint2007/4.6, 3 pp.
"SlideRocket the New Way to Present", Retrieved Nov. 22, 2011 at <<http://www.sliderocket.com/product/>>, 11 pp.
"Introduction to PowerPoint Web App", Retrieved Nov. 22, 2011 at <<http://office.microsoft.com/en-ca/web-apps-help/introduction-to-powerpoint-web-app-HA010378340.aspx>>, 3 pp.
Fell-Jacobs, "Work with aspect ratios to preserve your graphics when you copy slides", Retrieved Nov. 22, 2011 at <<http://office.microsoft.com/en-us/powerpoint-help/work-with-aspect-ratios-to-preserve-your-graphics-when-you-copy-slides-HA001142090.aspx>>, 2 pp.
U.S. Official Action dated Dec. 8, 2014 in U.S. Appl. No. 13/417,325.
"PowerPoint Blog Office Themes: The Infinite Variety Generator—Part 1" Published Dec. 27, 2011, PowerPoint Blog, Available at: http://web.archive.org/web/20111227023522/http://blogs.office.com/b/microsoft-powerpoint/archive/2006/07/13/office-themes-the-infinite-variety-generator-part-1.aspx, 4pp.
"PowerPoint Blog Office Themes: The Infinite Variety Generator—Part 2" Published Jul. 17, 2006, PowerPoint Blog, Available at: http://web.archive.org/web/20100802040653/http://blogs.msdn.com/b/powerpoint/archive/2006/07/17/668341.aspx, 5pp.
Translated Chinese Office Action mailed Aug. 20, 2015 for Chinese patent application No. 201310076722.0, a counterpart foreign application of U.S. Appl. No. 13/417,325, 13 pages.
Office action for U.S. Appl. No. 13/417,325, mailed on Jun. 11, 2015, Maloney et al., "Providing Theme Variations in a User Interface", 18 pages.

* cited by examiner

PROVIDING THEME VARIATIONS IN A USER INTERFACE

CROSS REFERENCE TO RELATED APPLICATIONS

This patent application is a continuation of U.S. patent application Ser. No. 13/417,325 titled "Providing Theme Variations in a User Interface" which was filed on Mar. 12, 2012 and which is expressly incorporated herein by reference.

BACKGROUND

Presentation programs are commonly used to create and present slide presentations. Skillful use of such presentation programs can result in an informative presentation that combines colors, graphics, and text in a manner than can capture and retain viewer interest.

Presentation programs can provide users with great flexibility in designing a slide layout, including selecting a distinctive combination of various configurable aspects, including colors, patterns, background images, fonts, and proportions. These visual elements can be selected using conventional user interface controls, and it is possible to develop many thousands of combinations of visual elements. A presentation program may have, for example, dozens of fonts that can be combined with hundreds of colors, which in turn can be placed on one of hundreds of backgrounds having different colors and visual object as accents.

While flexibility in creating so many combinations can be desirable, such flexibility can have its drawbacks. Just because a combination of visual effects is possible, that does not necessarily mean the combination is aesthetically pleasing or the combination works well together. In some cases, the combination of visual elements may be sub-optimal, based on a subjective evaluation. In many instances, a user generating a slide may not fully appreciate why a combination is (or is not) aesthetically pleasing, but they "know it when they see it." For slide authors that are not capable of assembling a combination of visual objects in an optimal and timely manner, providing pre-packaged combinations of the visual aspects is beneficial to the user.

It is with respect to these and other considerations that the disclosure made herein is presented.

SUMMARY

Concepts and technologies are described herein for providing various visually oriented themes for a slide presentation. The various combinations comprise a theme. These themes and any theme variations are conveniently provided via a graphical user interface ("GUI") for user selection. The presentation program file contains an identifier which allows the selected theme and variation to be backwards compatible with slide programs that do not provide the graphical user interface.

In one embodiment, a computer implemented method presents theme information for a slide in a graphical presentation that includes providing a GUI to a user by a presentation program, wherein the GUI provides a theme gallery including a plurality of theme templates, wherein each theme template represents a theme from a theme family, the theme including a combination of at least a color palette and at least one background graphic, and wherein one of the plurality of theme templates is a default theme. The GUI also provides a theme variation gallery that includes a first plurality of theme variation templates, wherein each theme variation template represents a variation in the theme family, and wherein each theme template and each theme variation template is a different thumbnail image.

The computer implemented method further includes receiving input to select a theme template as a current theme which is different from the default theme. The method also provides in response to receiving the input, updating the theme variation gallery to replace the first plurality of theme variation templates with a second plurality of theme variation templates. Each theme variation template in the second plurality of theme variation templates is a member of a theme family associated with the current theme.

A computer is also disclosed for providing a GUI for indicating themes that includes a memory storing a plurality of theme templates and a plurality of theme variation templates, wherein each including a different thumbnail image representing a different theme, and an input device for receiving input selecting a theme thumbnail template. The computer also includes a processor configured to provide the GUI to a user by a presentation program application, wherein the GUI provides a theme gallery that includes a plurality of theme templates each including a thumbnail image, wherein each theme template represents a theme from a theme family, and the theme includes a combination of at least a color palette and at least one background graphic, wherein one of the plurality of theme templates is a default theme. The GUI also provides a theme variation gallery that includes a first plurality of theme variation templates each including a thumbnail image, wherein each theme variation template represents a variation in the theme family. The processor is further configured for receiving input to select a theme template as a current theme which is different from the default theme, and in response to receiving the input, updating the theme variation gallery to replace the first plurality of theme variation templates with a second plurality of theme variation templates, wherein each theme variation template in the second plurality of theme variation templates is a member of a theme family associated with the current theme.

In another embodiment, a computer readable medium stores instructions that when executed cause a processor to provide a GUI to a user by a presentation program application, wherein the GUI indicates a theme gallery including a plurality of theme templates, wherein each theme template represents a theme capable of being applied to the slide, and wherein said theme includes a combination of at least a color palette and at least one background graphic. The GUI also indicates a theme variation gallery comprising a first plurality of theme variation templates, and wherein each of the theme variation templates represents a variation of a current theme in a theme family.

The instructions when executed further cause the processor to receive input selecting one of the theme templates, and in response to receiving the input to update the current theme, provide a second plurality of theme variation templates in the theme variation gallery, wherein each theme variation template in the second plurality of theme variation templates is a member of the theme family.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6A is a prior art presentation file structure and FIG. 6B is a presentation file structure according to one embodiment.

DETAILED DESCRIPTION

Figure 1:
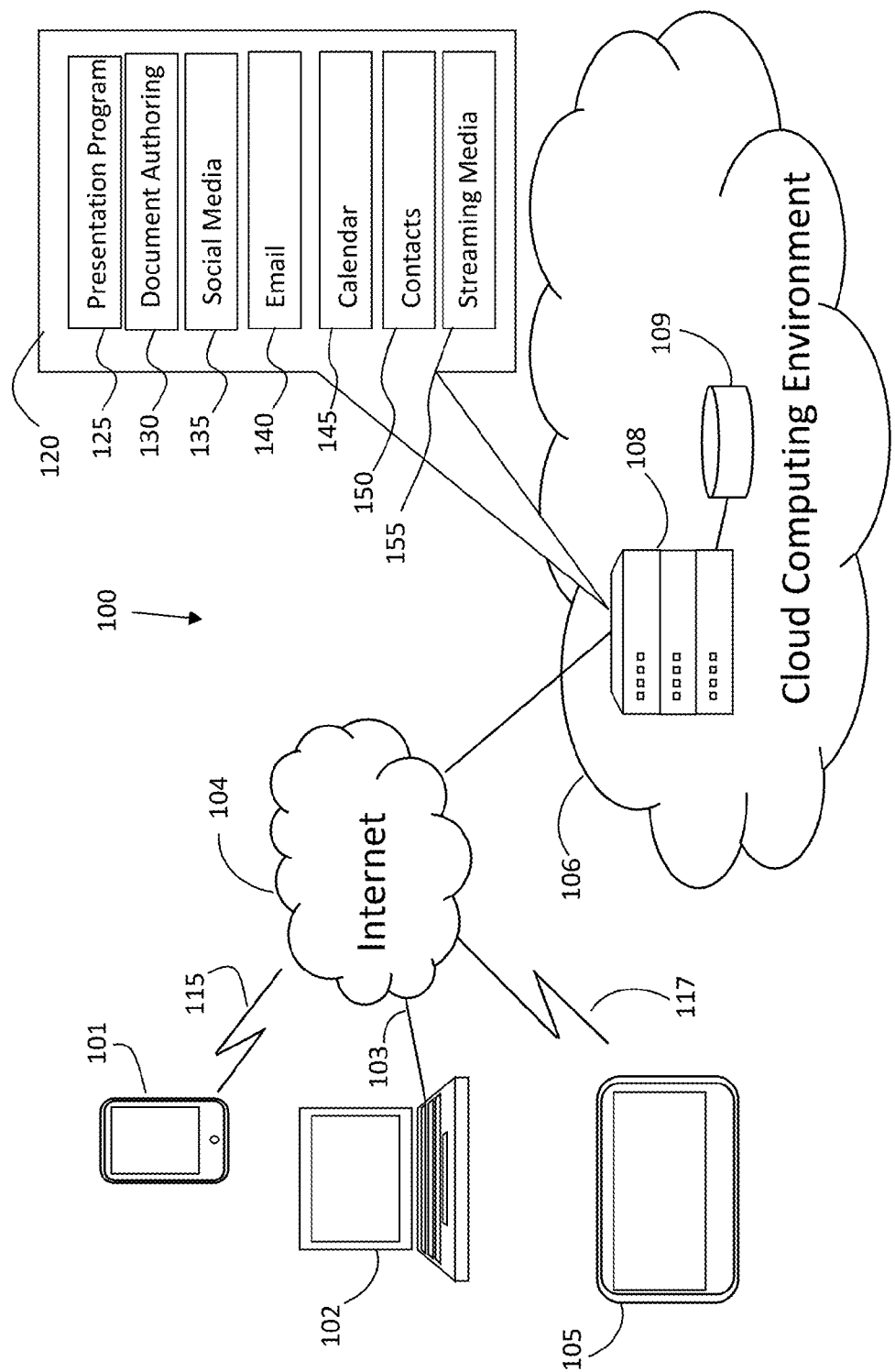
FIG. 1 is an illustration of one environment of a user interacting with a program providing a graphical user interface providing various themes and theme variations according to one embodiment presented herein.

In the following detailed description, references are made to the accompanying drawings that form a part hereof, and which are shown by way of illustration of specific embodiments or examples. In the drawings, in which like numerals represent like elements throughout the several figures, aspects will be presented of providing a user with thematic information that can be applied to a graphical presentation.

The following detailed description is directed to generally providing a graphical user interface of a presentation program that allows a user to select a theme and to potentially then select a theme variation from a set of theme variations associated with the theme. Presentation programs allow a user to generate, edit, or view a slide presentation. Typically, the slide presentation includes a series of slides which comprise text, which may incorporate other visual aspects, and have a coordinated layout. The slides may have visual aspects that involve background color, foreground color, accent colors, background images, various fonts, font colors, etc. The coordinated set of visual attributes for a slide is referred to as a theme. While a set of slides in a presentation may have a common theme, it is possible for each slide to have its own theme. Because of the many possible combinations of visual elements, a great number of themes are possible.

Conventionally, a user can select certain aspects of the visual elements of a theme using drop down menus and other types of user controls. A drop down list for selecting a font type is one example and the list size is proportional to the number of fonts in the list, which can be large. Color charts or color wheels can be used for selecting a color, and similar user controls exist for selecting layout options, background images, etc. A user interface that allows the user to select all of these options can be complex, and provide a great number of options to the user. While presenting so many options to the user does provide flexibility, it can be overwhelming. Some users may not be able to select a combination resulting in a desirable combination. Further, the number of permutations of all the possible, colors, visual elements, and styles can rapidly reach a large number. For example, a color palette comprising four different color instances could be defined by the user for application to visual elements. If there are 256 color choices for each color instance, the total number of color palette combinations is $256^4$, which is over four billion. However, many of these color combinations would be viewed as undesirable for a slide presentation. For example, black letters on a black background, with black foreground and black accents is likely to be undesirable.

A set of visual elements can be pre-packaged, so to speak, in a template as a set of default values. The template can be a thumbnail image that provides a sample of what a slide using the theme would look like. Thus, the template may have text for the purposes of illustrating font. Sample combinations of templates can be generated and presented to the user for selection. Each of these templates could each represent a theme, e.g., a combination of visual aspects including visual elements and styles. Selecting a template can indicate application of the theme to a slide. Thus, a template and a theme are closely related, but they are not exactly the same. The template is an exemplar of the theme. Typically, a single theme is represented by a single template, and the template is typically a thumbnail image of a slide with representative text.

Generating a single template for each possible theme would result in too many templates for the user to select from (which could be millions of templates). Thus, a reduced subset of templates are be generated, which effectively eliminates many theme combinations. Reducing the number of combinations, by itself, is not undesirable, since many combinations of visual elements may not be very cohesive or desirable.

To simply indicate a combination of visual elements, the user can select a theme thumbnail image or icon (also referred to as a "theme template") that represents a particular theme. Each theme is a member of a theme family, which is a collection of themes related in some graphical manner. The user can be presented with the theme templates and can select one template for selecting a theme. Then, once a theme is selected, further theme templates representing variations of the theme of the same theme family are generated. These theme variations are manifested by another set of templates, called theme variation templates, which are presented to the user. The user can then select the theme variation associated with the theme family by selecting the theme variation template, and the result can be applied to the slide. With respect to either the themes or theme variations, the user is not presented with all the possible combinations of visual elements. Rather, the user is provided with two structured subsets of templates—the first being the theme templates representing different theme families and the second being the theme variation templates representing other theme family members. In some embodiments, a user is initially presented with a subset of templates for a given set, and can scroll through to see the remainder.

The number of theme variations in a theme family is limited in number, which in one embodiment is limited to eight. Thus, each selected theme may have eight theme variations defined. Each theme variation is designed so that the theme variations are considered aesthetically pleasing and generally graphically related to the selected theme. Thus, a user lacking graphical layout design skills can be assured of having a structured, large number of visual combinations to select from, and can select variations of a particular theme very quickly and easily.

Presenting a template, as opposed to having the user select from a series of menu options to indicate a theme, allows the user to quickly view and qualify the combination of visual elements. It is desirable that the selected theme provides an aesthetically pleasing combination of visual elements in a slide layout. By using the graphical user interface, a user can readily select a desired combination of elements, where the combination is typically viewed as a coherent collection of visual elements and visual styles.

To aid in the presentation program identifying the appropriate theme family, a theme family identifier ("TFID") is stored in the slide file which identifies the theme. The TFID is designed to be backwards compatible with previous versions of slide presentation programs that do not provide the user with selection of a theme and various theme variations.

Turning now to the figures, one context for using the graphical user interface concepts disclosed herein is shown in the system illustration 100 of FIG. 1. In FIG. 1, the user could be using various types of computing devices. The computing devices include a smartphone 101, a laptop computer 102, or a tablet computing device 105. The computing devices 101, 102, and 105 may incorporate a touch-screen for the user to interact with the presentation program, or may utilize a conventional mouse or pointing device for user interaction. The computing devices may also rely on other forms of input, such as speech input for interacting with the user.

The computing devices may utilize wireless connections 115, 117 for transferring data for interacting with other parties or servers located a cloud computing environment 106. The wireless data for the computing devices are conveyed in one embodiment by the Internet 104 to the cloud computer environment 106 and can be based on various readily available technologies, including various cellular based technologies (CDMA, GSM, 4G, EDGE, etc.) originating from cellular infrastructure provided by a cellular service provider (not shown). Other wireless technologies (e.g., WiMax, WiFi, etc.) could be used. The wired technologies can be based on ISDN, cable modems, DSL, and other well-known technologies.

The connectivity afforded by the wired 103 and wireless 115, 117 communications through the Internet 104 provides the computing devices with access to servers 108 in the cloud computing environment 106. Other configurations are possible. Although the concepts illustrated herein may refer to a single server 108, there may be various servers involved. For example, one server 108 accessed by a computing device may in turn access another server 113. A plurality of servers may be used in another embodiment in order to provide the services disclosed herein.

In one embodiment, the computing device may store and locally execute a presentation program. Thus, a user may use a touch-screen on a computing device to select a theme or theme variation without interacting with another computer. In other embodiments, the computing device may execute a client application that interacts with a server 108 that may execute various application programs 120 including the presentation program 125. In one embodiment, the user's device incorporates a client application that comprises the presentation program that allows creating and editing of a slide presentation, and where the files are stored in the server 108. In other embodiments, a server side presentation program may be executed in a shared or distributed manner across one or more servers and interact with the client application in the computing devices 101, 102, or 105. Other divisions of functionality are possible with respect to the computing devices 101, 102, and 105, and network servers 108.

The application programs 120 may include a document authoring application 130 that may create and edit different forms of documents, such as text documents and spread sheet documents. The concept of themes and theme variations may be extended in whole or in part to these documents, such as word processing documents. Other applications executing on the server 108 may include social media applications 135 for group related messaging and communications. Another application program present may be an email/messaging application 140 that is involved in various messaging capabilities, including instant messaging. A calendar application 145 may allow for organizing meetings and events. A contacts application 150 may allow for organizing contact information for the user and/or individuals associated with an enterprise. A streaming media application 155 may provide for streaming digital data, such as audio or video files. Each of these applications may store data, which server 108 may maintain in a data store 109 in the cloud computing environment 106, which can comprise various storage systems.

Figure 2A:
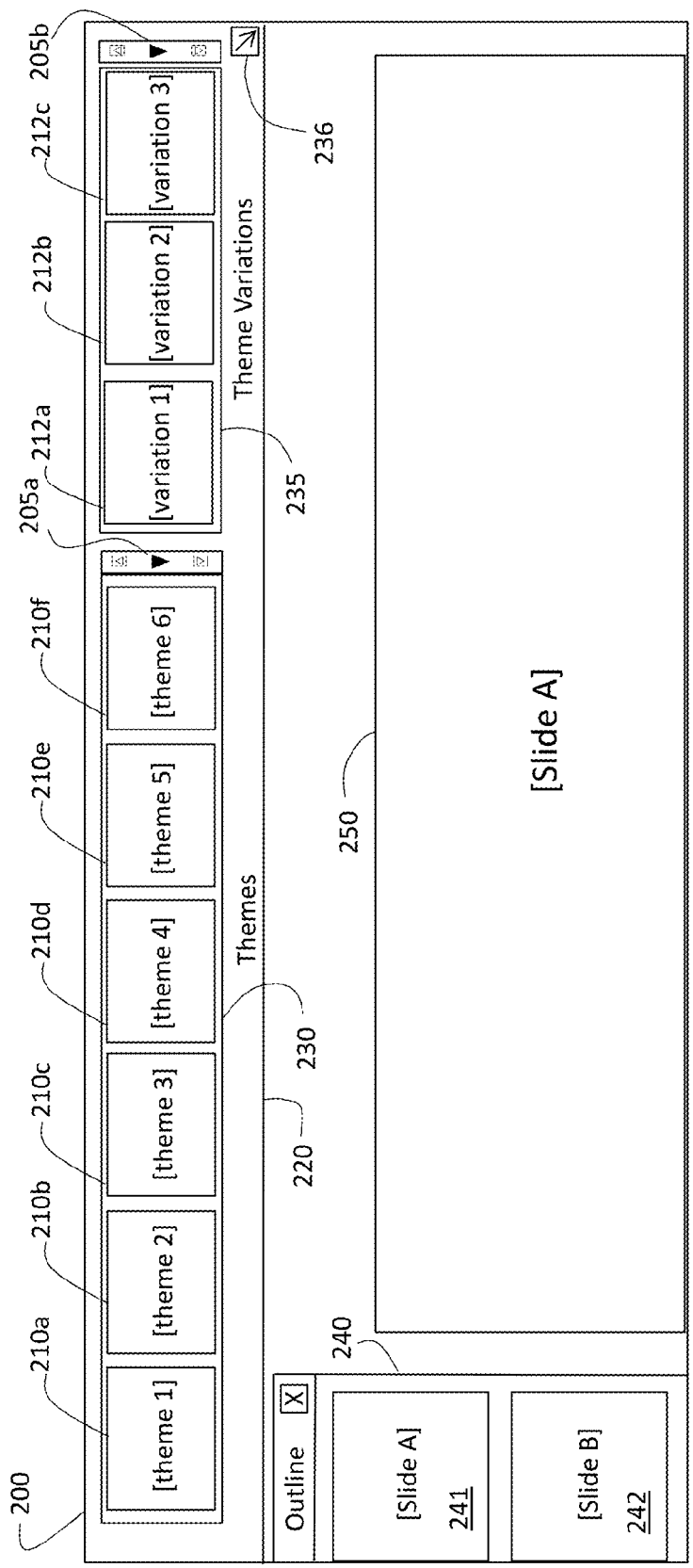
FIGS. 2A and 2B illustrate embodiments of a graphical user interface on a slide presentation program providing a user with various themes and theme variations.

Turning now to FIG. 2A, a schematic diagram shows one embodiment of a graphical user interface ("GUI") 200 for a user that is presented by a presentation program. The GUI may be associated with a presentation program that allows the user to generate or edit a slide in a slide presentation. In this embodiment, a navigation pane 240 is provided that indicates thumbnail images of the user's defined slides, which includes slide A 241 and slide B 242. The use of square brackets "[ ]" surrounding text in the figures indicates that the bracketed text is not part of the visual display contents of the slide, but a descriptor of that element. Thus, no text stating "slide A" is presented in slide A 241 in the GUI.

The GUI also comprises a pane displaying the current slide 250. Since only a portion of the display 200 on the computer is shown, only a portion of the current slide, slide 250, is shown in the editing pane. If no presentation file is selected when opening the presentation program, a default (e.g., blank) slide 250 may be presented.

A ribbon bar 220 may be employed as part of the control panel of the GUI in the upper portion of the display 200. In this embodiment, the ribbon bar 220 illustrates available themes and theme variations. The ribbon bar 220 is divided into two galleries. A first gallery is the theme gallery 230 that is labeled "Themes." A second gallery is the theme variation gallery 235 and is labeled as "Theme Variations." A user control 236 may allow the user to expand the size of the galleries.

The theme gallery 230 illustrates six thumbnail images or templates 210a-210f, each which represents a theme. A user control 205a can be used to scroll or expand the selection of themes. In other embodiments, the user control can comprise a touch screen which is swiped by the user's finger to view and select the templates. Thus, the user control 205a may not be presented as a user control icon in all embodiments. In one embodiment, the first template 210a in the theme gallery 230 is the default theme, and is the theme applied by default to the slide 250 in the editing pane if no other theme is selected or associated with the slide 250. There may be many templates available for viewing in the theme gallery 230. In other embodiments, the file 250 may have been opened and previously associated with a theme. In some embodiments, the theme gallery may somehow distinguish the current theme in some manner.

Similarly, a theme variation gallery 235 is presented, which may display a fewer number of theme variation templates 212a-212c. A similar user control 205b allows the user to select and/or expand the set of theme variations that are available. Again, a touch screen may be used, and if so, the user control icon 205b may not be present. In one embodiment, up to eight theme variations are associated for each theme family. The theme variation templates 212a-212c displayed are associated with the selected theme, which may be the default theme or the theme associated with the slide 250.

A user can select a theme from the theme gallery 230 by selecting the corresponding template. This could be accomplished by touching the template with a finger for touch screen computing devices, or using a mouse for other types of computing devices. Once selected, the template may be emphasized in some manner to indicate it has been selected or is the current theme. Once selected, the templates for the theme variations in the theme variations gallery 235 are updated to reflect the theme variations associated with the selected theme template. In this manner, a two-stage selection process is provided to the user. The theme may be applied to the slide 250 once the theme is selected, and similarly, the theme variations may be applied to the slide 250 once the theme variation is selected. In one embodiment, a theme family may comprise eight members, and there would be seven theme variation templates shown in the theme variation gallery that are associated with each theme template in the theme gallery.

Each theme variation may be identified by a name, which may be presented to the user at various times. For example, each theme presented on the graphical user interface may be associated with a variant name. In some embodiments, the name of the theme variant may be indicated with the thumbnail image. In other embodiments, the theme variant name could be used in an alternative graphical user interface, such as a drop-down menu selection user control or to aid in the user searching for a theme name. In some embodiments, two theme variants that only vary in the aspect ratio, but that do not otherwise vary with respect to the color palette or background images, may have the same name presented to the user.

Figure 2B:
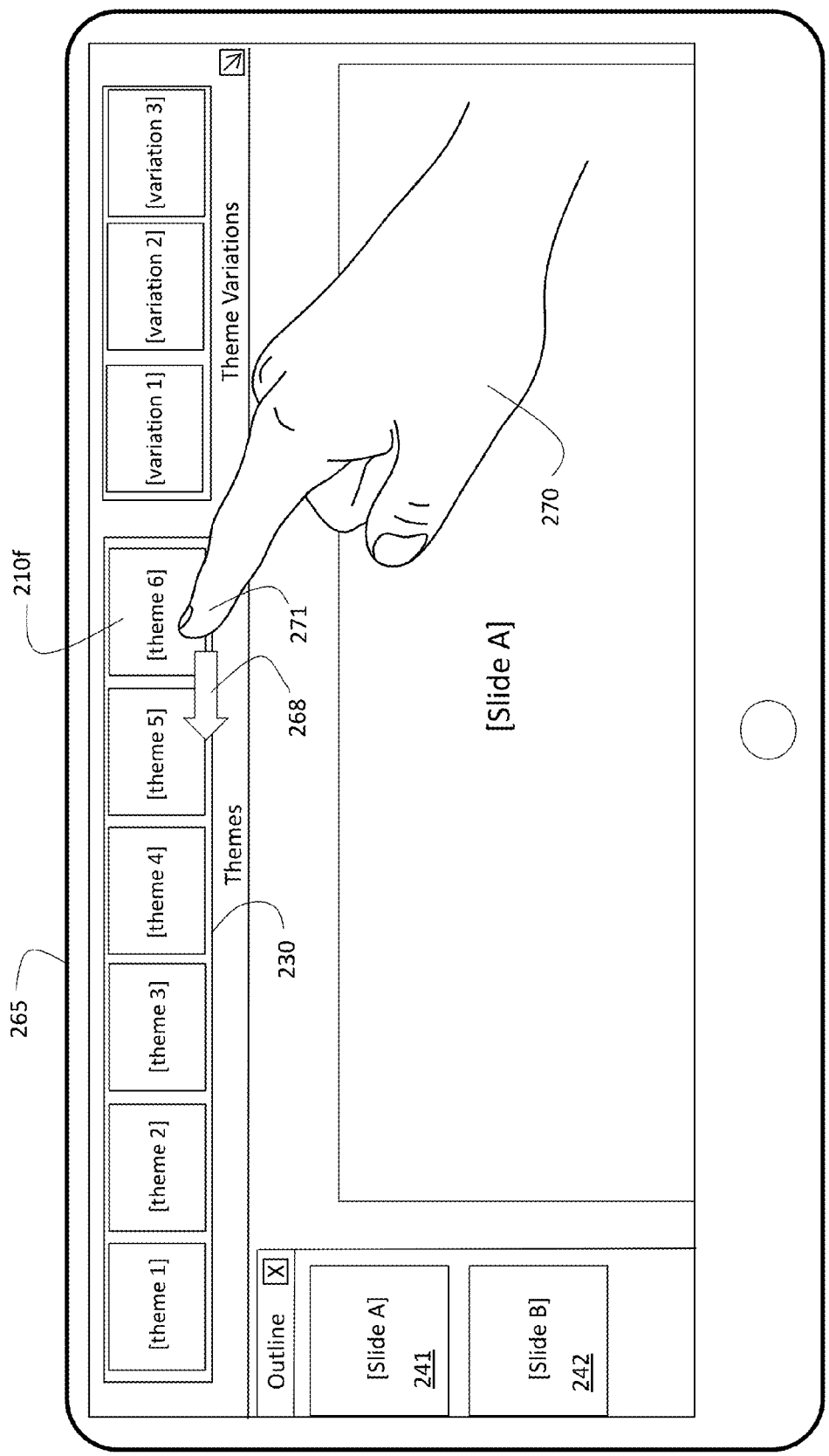

FIG. 2B illustrates another user interface presented on a tablet type computing device 265. The user's hand 270 is positioned so that the finger 271 selects a theme template 210*f* from the theme gallery 230 and slides the theme template 210*f* in a direction indicated by the arrow 268. This results in scrolling the theme templates to the user. Note that in this embodiment, the user controls 205*a* and 205*b* shown in FIG. 2A may not be necessary.

Figure 3A:
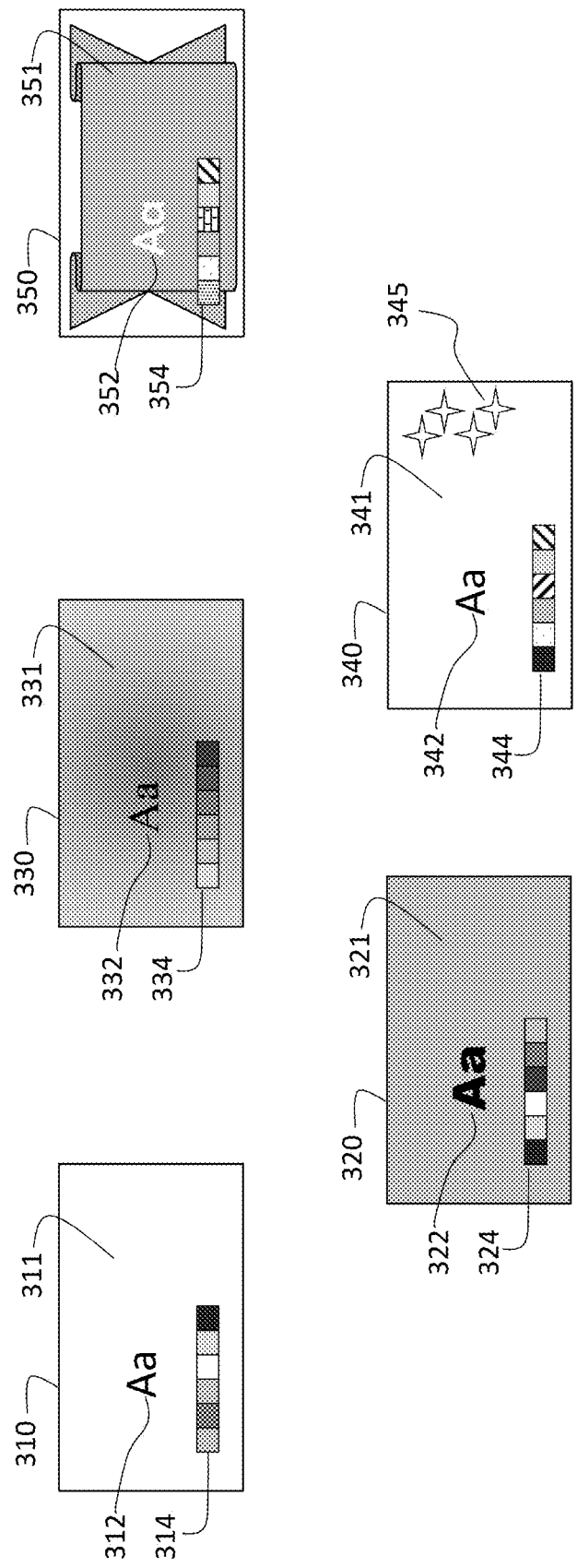
FIGS. 3A and 3B illustrate various themes and theme variations provided by a presentation program.

FIG. 3A illustrates one embodiment 300 of the relationship between a theme and theme variations. The templates 310, 320, 330, 340, and 350 shown in FIG. 3A represent different themes. Any distinct combination of visual elements could be a distinct theme. Each template illustrates a particular combination of various visual elements that can be used in the theme or theme variation. The particular visual elements shown in the templates in FIG. 3A should not limit the number and type of visual elements that can be used. Rather, the visual elements shown in FIG. 3A are to illustrate the concepts.

Further, because the figures are provided in black-and-white, the representation of different colors in a color pallet 314 is accomplished by various levels of shading and pattern filling such that each represents a different color. In the embodiment shown in FIG. 3A, each of the color palettes 314, 324, 334, 344, and 354 have a different color combination. A combination of colors in one palette, which may differ by only one color from another palette, is considered to be a different color palette. In other embodiments, the color palette may comprise a greater or fewer number of colors.

In some embodiments, the themes can be distinguished at a high level based on colors (with their associated patterns, textures, and gradients) and the visual objects included in the background of the slide. For example, template 310 includes a blank background 311, whereas template 320 includes a colored background 321. Template 330 includes a gradient background 331. Template 340 includes a set of background images 345 in the background 341, and template 350 includes a banner 351 that is shaded as a background object.

FIG. 3A also shows that the fonts 312, 322, 332, 342, and 352 may vary in different themes. In some cases, the fonts may be the same (see, e.g., font 312 and 342) or may have different colors. Other variations than what is described above may form the basis for distinguishing one theme from another.

The number of templates (and corresponding themes) provided to a user on the GUI may vary. Typically, there are between 6 and 100 templates, although other embodiments may have a greater or fewer number of templates.

Figure 3B:
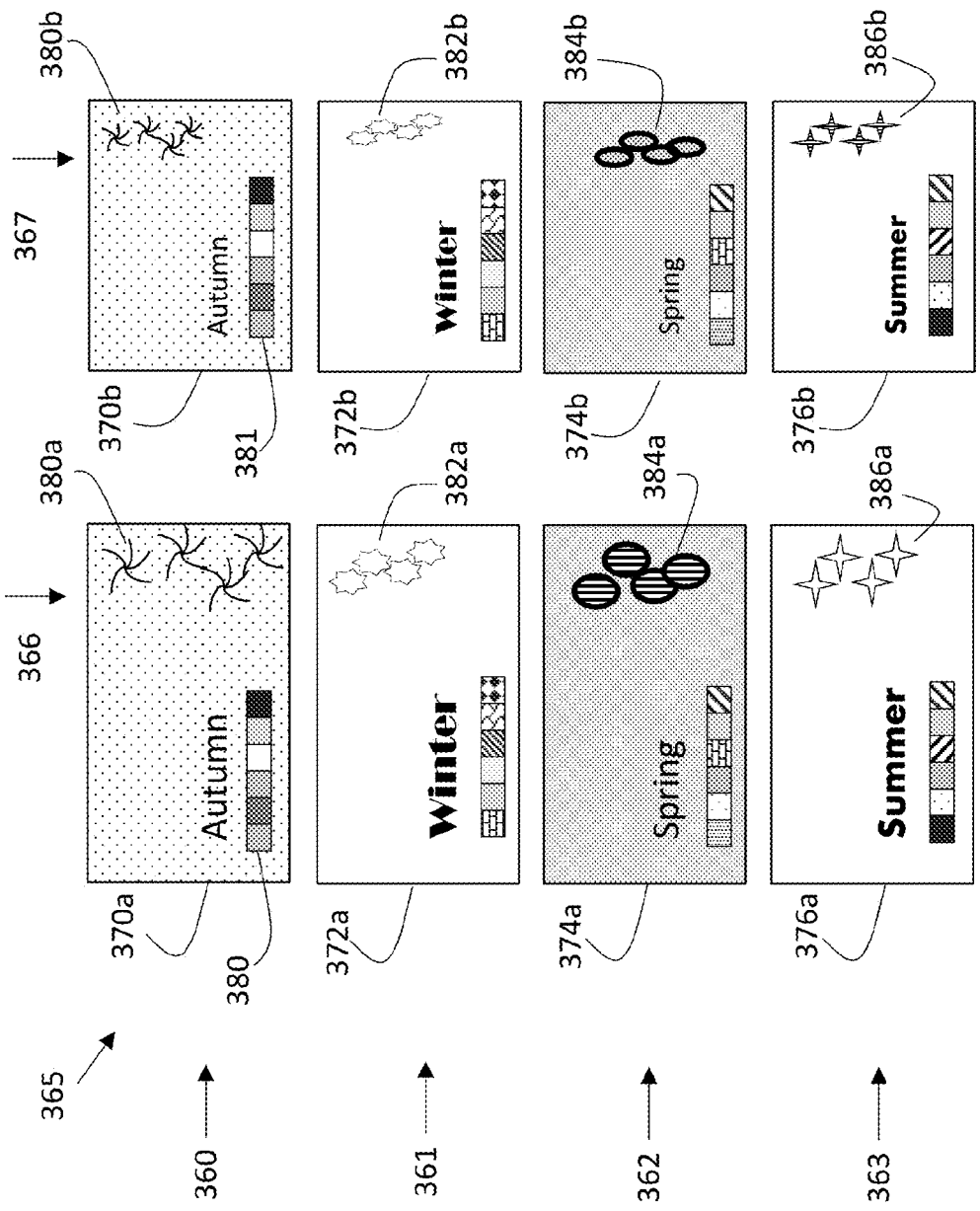

A set of theme variations is shown in FIG. 3B. These are based on the theme associated with template 340 from FIG. 3A. Thus, in this embodiment, the templates representing the variations on the theme in FIG. 3B include a template 376*a* corresponding to the theme itself. The set of theme variations shown in FIG. 3B can also be referred to as a "theme family."

Typically, one of the templates from the theme family is presented in the GUI as a theme. If that theme is selected, then the remaining members of the theme family, e.g., the theme variations, are indicated as theme variation templates. It is not significant which of the theme variation templates is chosen to represent the family in the theme gallery. However, other theme variation templates in the theme family are not used in the theme gallery. The templates in the theme gallery represent distinct theme families.

In FIG. 3B, the theme family is illustrated using two columns 366 and 367 and four rows 360-363. The first column 366 and the second column 367 have the same color and content, but have a different aspect ratio. The templates in the first column 366 are based on a 16:9 aspect ratio. This is the ratio of the width to the height. This is the same aspect ratio that may be found, for example, in the aspect ratio of screens on high definition televisions ("HDTV"). The aspect ratios found in the second column 367 is based on a conventional 4:3 aspect ratio. The 4:3 aspect ratio is typical of conventional television display screens (e.g. non-HDTV televisions).

The 16:9 aspect ratio may allow the slides to be formatted to better fit current display devices. This avoids deficiencies that may occur when converting a 4:3 format slide to a 16:9 format slide. Conventional techniques include letterboxing (e.g., adding a blank space above and below the image) or stretching the image, which distorts the relative positioning of the visual elements.

The rows 360-363 represent theme variations which alter one or more of the color palette, e.g., 383*a* and 383*b*. The theme variation may also alter the structure, shape, fill, background objects, or color of background objects, e.g., 384*a* and 384*b*; see also 386*a* and 386*b*. In some cases, the background objects may be the same, but proportionally spaced for the aspect ratio, e.g., 380*a* and 380*b*; see also 382*a* and 382*b*.

FIG. 3B also illustrates how different background shapes can be applied to variations of the theme. Each of the templates in FIG. 3A incorporates a grouping of visual objects, e.g., 380*a*, 382*a*, 384*a*, and 386*a* which is unique. While this is not a requirement for different theme variations, it illustrates how variations may be different, but related in some aspect. Frequently, the color palette may be selected to complement the background objects. For example, in templates 372*a* or 372*b*, which may reflect a winter theme, the color palette may comprise blues, whites, and other "cold" colors. The templates 370*a*, 370*b* may reflect an autumn theme, and comprises a color palette of brown, yellow, red, and other colors associated with the fall season.

Flexibility exists in defining how the theme variants different from a given theme. There variations may exist in only one visual aspect (e.g., changing a color palette) or in a combination of visual aspects (e.g., aspect ratio, color palette, and background image). Although FIG. 3A illustrates eight variations for each theme, there may be a greater or fewer number in other embodiments.

By structuring themes and theme variations in the manner as exemplified in FIG. 3A and FIG. 3B, and using the GUI as shown in FIG. 2A, a user can easily compare themes, and view the associated theme variations for each theme. This avoids presenting variations on a theme where the user does not have any interest in the theme. In this manner, a greater number of options can be presented in a structured manner to the user without overwhelming the user, and allowing easy selection. Using the above structured approach is beneficial for devices that may have limited display space, such as smart phones or tablet computers. Presenting a great number of templates in an unstructured manner on such a device may be difficult and present a cumbersome user interaction experience.

Figure 4:
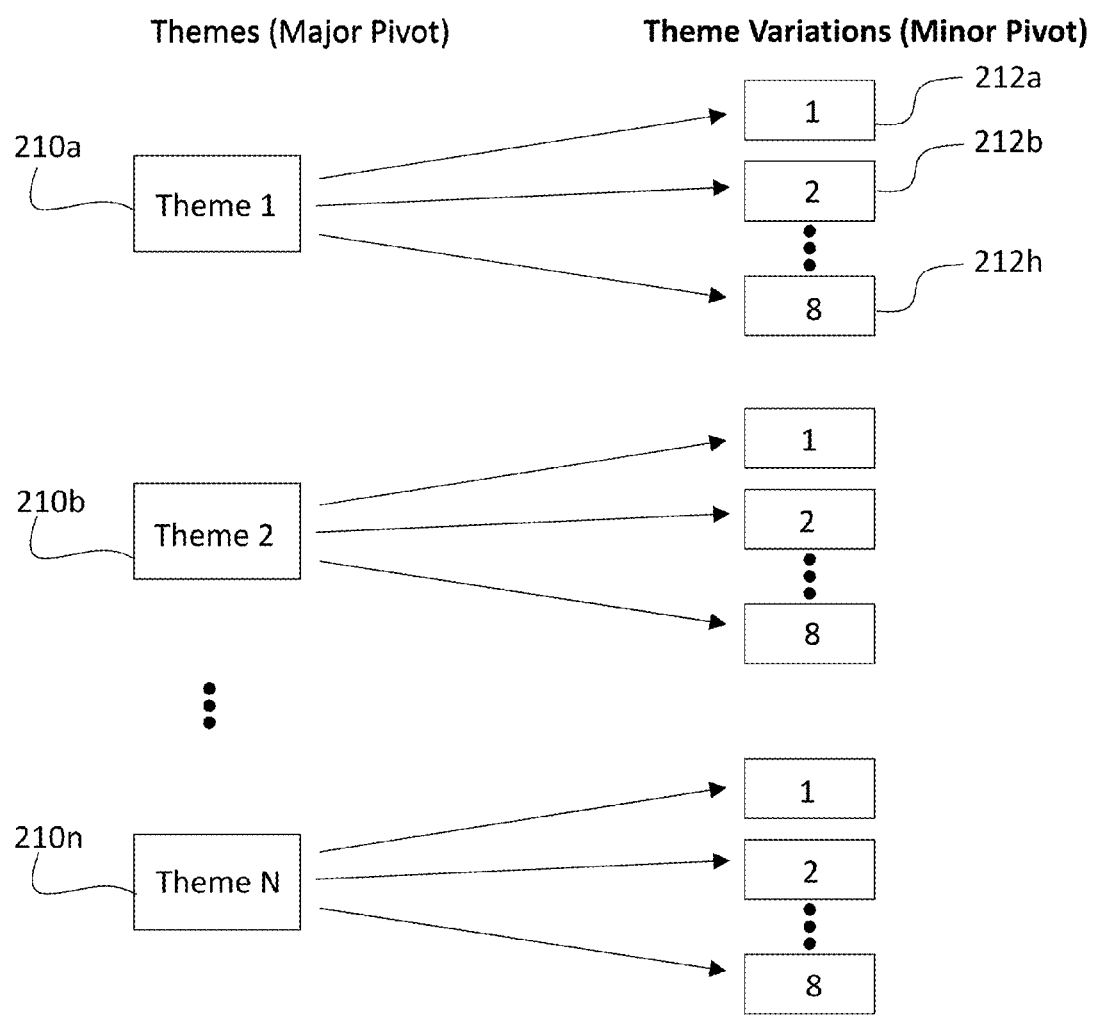
FIG. 4 is a representation of the relationship between a theme and theme variations.

FIG. 4 illustrates a logical hierarchy of themes and theme variations in one embodiment. In FIG. 4, the themes 210a, 212b, and 210n are shown on the left side. Theme 1 210a could be represented by a template and could be selected from any one of the eight theme variations. By defining one of the theme family members as representing the theme, there are only seven other distinct theme variations. The number of themes can vary, but typically there are between 6 and 100, although other embodiments may allow for a greater or lesser number. Each theme is associated with a limited number of theme variations. In this embodiment, eight theme variations 212a-212h are associated with a theme family and one of the eight theme variations is selected as the theme.

Figure 5:
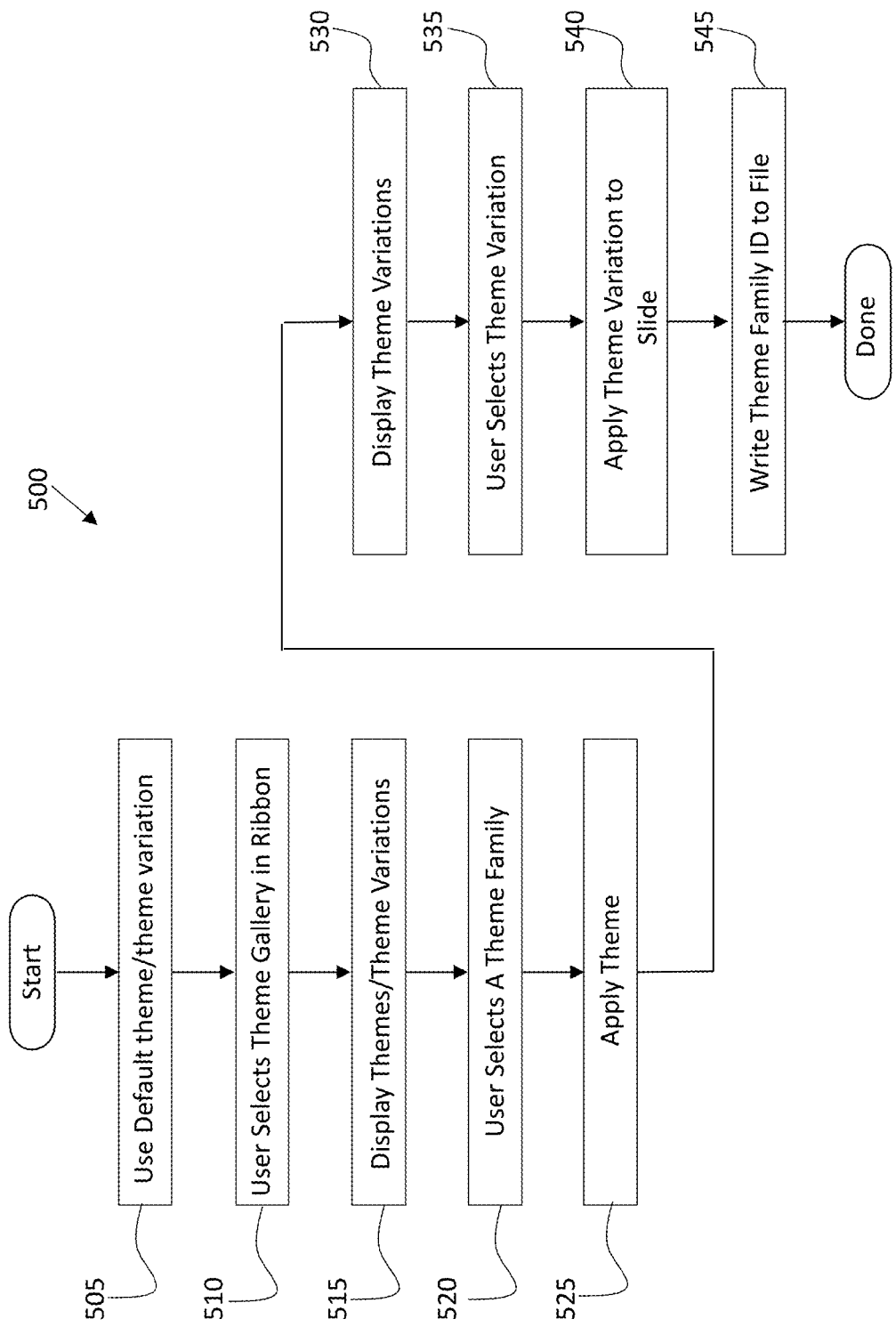
FIG. 5 is a process flow illustrating operations associated with a user interacting with a graphical user interface for selecting a theme and a theme variation.

In light of the above disclosure of a theme and associated theme variations, an overview of the process flow for the user selecting a theme and associated theme variation is shown in FIG. 5. It should be appreciated that the logical operations described herein with respect to FIG. 5 and the other figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or less operations may be performed than shown in the FIG. 5 and described herein. These operations may also be performed in a different order than those described herein.

The process 500 in FIG. 5 begins with the presentation application using a default theme/theme variation in operation 505. If the presentation application is being initiated by selecting an opening a file, e.g., a slide presentation, the application will use instead the theme/theme variation associated with the file. In this case, the default value is replaced by the theme/theme variation in the file. In other embodiments, this operation may be optional. The user could create a slide presentation (instead of opening an existing file), and begin by selecting the theme and theme variation as described below.

In operation 510, the user can select to view the theme gallery in the ribbon if it is not already being presented. In other embodiments, other user controls, such as drop-down menus, can be used to view the theme/theme variation galleries. Once the theme gallery is selected for viewing, then in operation 515 the user may be presented with various templates associated with various themes and theme variations. In one embodiment, the first theme template displayed in the theme gallery is associated with a default theme, and the theme variation templates are displayed which are associated with the theme family of the default theme. The default theme is used in the absence of the presentation application opening a presentation file indicating a different theme is to be used or the user selecting a theme. In some embodiments, when the user is creating a new file and selects a theme, a sample slide may be presented to the user reflecting the stylized elements of the theme. Because the icon in the gallery may be limited in the resolution of detail that can be presented, a full size sample slide may allow the user to better evaluate the theme. Similarly, if the user selects a theme variation, the sample slide may be updated. Then, the user may proceed with creating the slide presentation. Other embodiments may incorporate other variations as to how the initial slide may be generated.

In operation 520 the user selects a theme family by selecting a template displayed in the theme gallery. In reality, this is selecting a particular theme variation, which happens to be the theme variation template selected to represent the theme family. In other words, selecting a theme template in operation 520 is selecting the theme variation template chosen to represent the theme family in the theme gallery that is selected.

Selecting the theme thumbnail image may be accomplished by using a pointer to select the template. Once selected, the presentation application then applies the theme in operation 525 to the slide 250 being edited. This could result in applying the indicated theme to a blank slide, if a new slide was indicated. This could also result in applying the theme to an existing slide 250, if present.

Once the theme is selected, then in operation 530 the presentation application displays the templates associated with the theme variations in the theme variation gallery. In operation 535 a user may select a theme variation, which is to be applied. This operation may be skipped if the user is satisfied with the theme selected.

Once the theme is determined, the presentation program may write a theme family identifier ("TFID") to the slide file. The TFID may be numerical tag that is located at the beginning of the slid file and may be used to identify the particular theme which the theme variation is associated with. The reasons for doing this are explained below and involve backwards compatibility of different versions of the presentation application and how the created presentation files are structured.

Figure 6A:
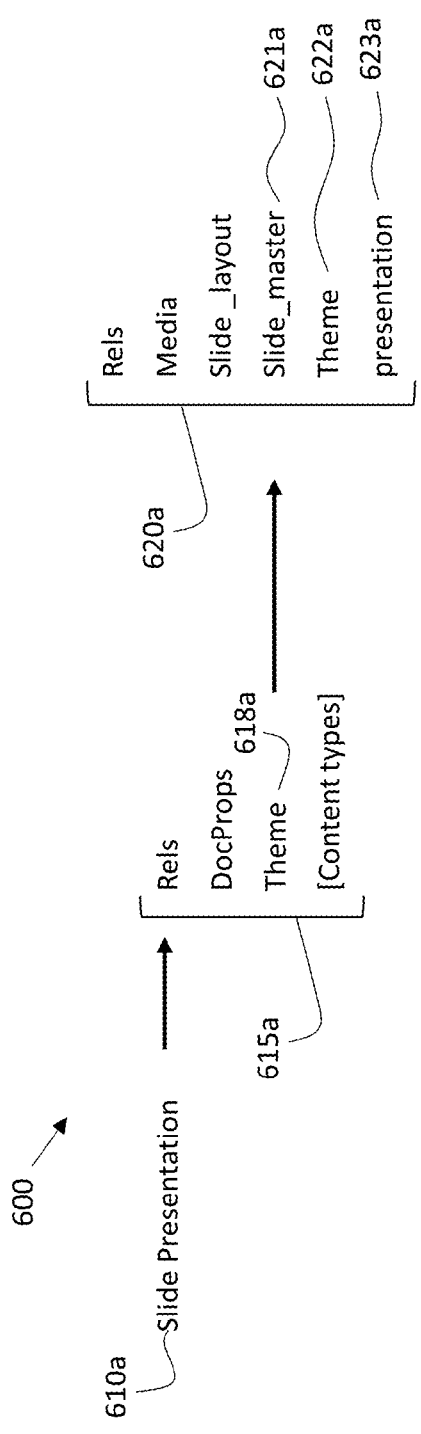
FIGS. 6A and 6B illustrate presentation file structures, where

A slide presentation file may be described as an open XML file termed a package comprising a collection of zipped or compressed files or folders. These parts may comprise information about the relationship of the folders, slide contents, or contain further files. This is illustrated in FIG. 6A, which depicts a prior art file structure 600. The structure 600 describes a presentation file that does not incorporate theme variants, but explaining how this file structure is used provides an introduction as to how the structure can be modified to accommodate a presentation file that does accommodate theme variants.

The file structure 600 involves the slide presentation file 610a, which comprises folders 615a, which includes a theme folder 618a. This theme folder 618a, in turn, points to other parts 620a which include further information describing the slide presentation. In one embodiment, the further parts 620a may include a slide_master component 621a and a theme component 622a. The contents of the presentation itself (e.g., text and images) are in the presentation component 623a.

The visual aspects are indicated in the slide_master component 620a and the theme components 621a. The theme component 622a indicates information about the visual aspects of a slide which can be applied to non-slide type documents, such as a word processing document. For example, the aspect of a theme defining a font or font color for a slide can be used to indicate a corresponding style in a word processing document. Thus, the theme component 622a may be used for other non-presentation files. Visual aspects that are specific to a slide are stored in the slide_master component 621a.

Figure 6B:
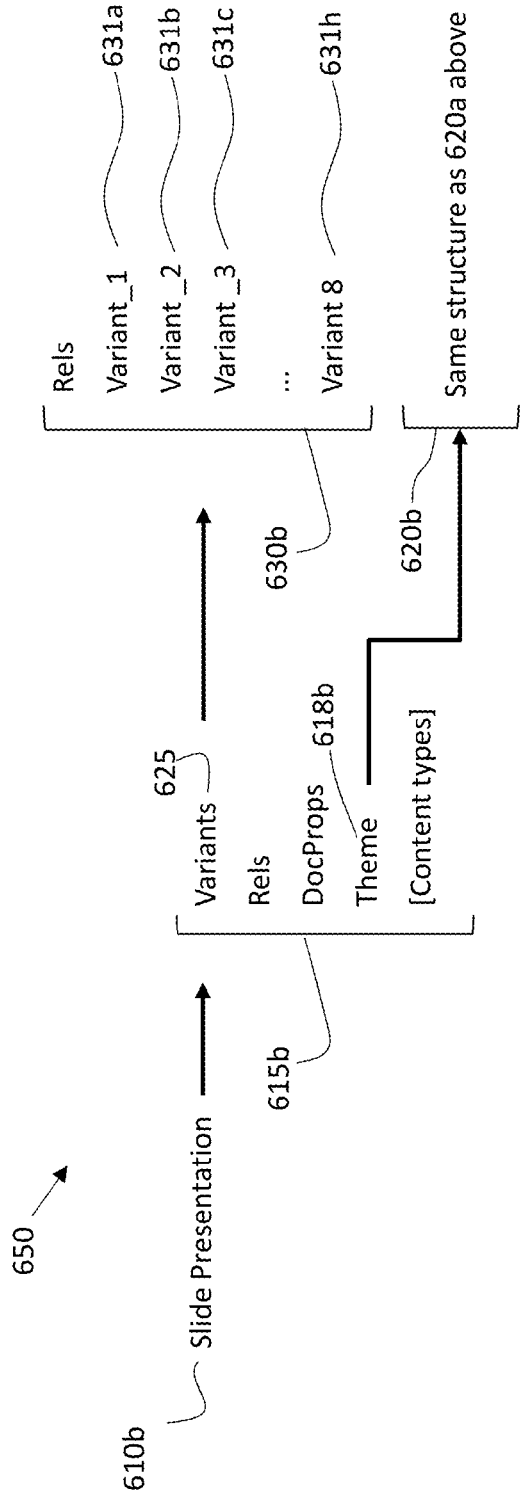

The file structure 600 allows a single theme to be indicated, and for purposes herein it can be referred to as the conventional file structure of a slide. To allow multiple theme variations to be applied to a selected theme, the file structure needs to be modified to retain information about the theme variations associated with the selected theme. This new file structure can be referred to as a "super-theme" file structure since it identifies a selected theme, and other possible theme variations. The file structure is shown as the super-theme file structure 650 in FIG. 6B.

The super-theme file structure 650 maintains information about theme variants than can be applied. This slide presentation structure is backwards compatible with presentation programs that generate and receive a conventional file structure 600. The super-theme slide structure 600 does this by incorporating an additional first level folder added to the package 615a. Specifically, a new folder called variants 625 is added at the top level that points to a series of theme variation components, variant_1 631a through variant_8 631h. Each of these theme variation components may incorporate information that is found in the conventional file structure theme component 622a. The theme variants 631a-631h are all part of a given theme family, and the selected theme is one of the variants. In other words, the structure 620b of a theme 618b is the same as one of the variants 631a-631h.

In the super-theme file structure 650, the high level package 615b includes the conventional theme component 618b that points to conventional folders 620b, which in turn includes the same information as in the group of files 620a and specifically the theme folder 622a. Whatever theme variant 631a-631h that is selected for a slide is also indicated as the theme 618b. Thus, a slide presentation program expecting a conventional file structure will process the super-theme file structure 650 in the same way as the file structure 600. Namely, the theme folder 618b will be examined, and the set of files 620b it points to will be retrieved. Thus, a conventional presentation program will ignore the variants folder 625 in file structure 650. This ensures the new file structure is backwards compatible.

Once a theme variation is selected, the presentation program can strip out the non-selected variant components 631a-631h as appropriate. This ensures that the files sizes are not unnecessarily expanded.

When a presentation program that is capable of displaying theme variations in the gallery opens the slide file, the presentation program expects the new file structure 650, and it will read a theme family ID ("TFID") value that is stored in the slide file format. The presentation program can then use the TFID to determine which super-theme was used to create the current version. This allows the presentation program to then provide the template gallery of theme variations appropriate to a document that is opened, and to which one of the theme variants is applied. This allows the user desire to select a new theme variation for the slide, if desired. All of the variants of a super theme have the same TFID.

The variant names may be the same if they are describing the same set of colors/images/etc. and are only different by having aspect ratios. Thus, if some of the theme variants have the same name, only one variant will be presented to the user depending on their presentation slide size.

The super-theme file structure can also be used to more efficiently identify the contents of similar theme variations. As noted in the discussion of FIG. 3, some theme variations may comprise similar elements. For example, templates 330, 335, and 338 all comprise an arrangement of four ovals 332a, 332b, and 332c. A similar or same structure may be present in various theme variations. It is possible that instead of replicating the same structure for each theme variation, the common elements it could be commonly referenced. Thus, in FIG. 6, each of the variant files 631a-631h could reference a common background structure, rather than replicating it in each variant file. This aids in reducing the size of the super-theme file structure.

Figure 7:
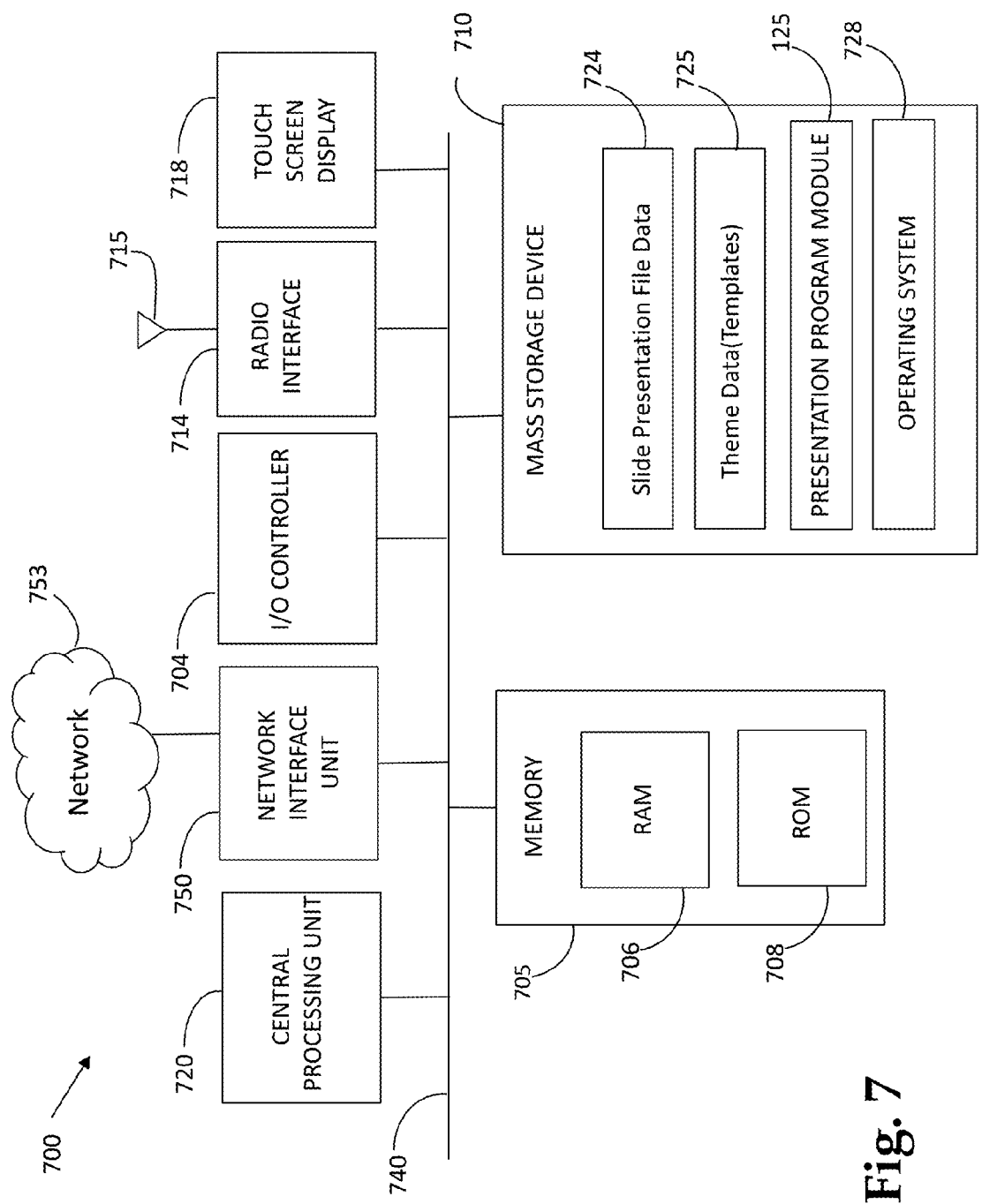
FIG. 7 illustrates a computer architecture of a computing device configured to provide a graphical user interface providing various themes and associated theme variations.

The process flow described above and other related functions can be implemented in one embodiment by the computing architecture of a computer device 700 as shown in FIG. 7. FIG. 7 shows an illustrative computing architecture for a computing device capable of executing the processes described. Although FIG. 7 describes the computing device such as a smartphone 101, laptop 102, or tablet computer 105, the computer shown in FIG. 7 may illustrate a conventional server computer, desktop computer, or other type of computer utilized to execute any aspect of the processes presented herein. Other architectures or computers may be used to execute the software components presented herein.

The computer architecture shown in FIG. 7 includes a processor 702 (a.k.a. as a centralized processing unit or "CPU"), a system memory 705, including a random access memory 714 ("RAM") and a read-only memory ("ROM") 716, and a system bus 712 that couples the memory to the CPU 702. A basic input/output system containing the basic routines that help to transfer information between elements within the computing device 700, such as during startup, is stored in the ROM 716. The computing device 700 further includes a mass storage device 710 for storing an operating system 718, application programs, and other program modules, as described herein.

The mass storage device 710 is connected to the CPU 702 through a mass storage controller (not shown), which in turn is connected to the bus 712. The mass storage device 710 and its associated computer-readable media provide non-volatile storage for the computing device 700. Although the description of computer-readable media contained herein refers to a mass storage device, such as a hard disk or CD-ROM drive, it should be appreciated by those skilled in the art that computer-readable media can be any available computer storage media that can be accessed by the computing device 700.

It should be appreciated by those skilled in the art that computer-readable media may be any available media that can be accessed by the computing device 700, including computer-readable storage media and communications media. Communications media includes transitory signals. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing device 700. However, the computer readable storage media does not encompass transitory signals.

According to various embodiments, the computing device 700 may operate in a networked environment using logical connections to remote computers or servers through a network (not shown in FIG. 7). The computing device 700 may connect to the network 720 using an antenna (not shown). In other embodiments, connection to other types of networks may be accomplished using an input/output controller 712. The input/output controller 712 can be used for receiving and processing input from a number of other devices 708, including a keyboard, mouse, or electronic stylus (not shown in FIG. 7). Similarly, an input/output controller 712 may provide output to a display screen 706, a printer, or other type of output device (also not shown in FIG. 7). In one embodiment, the computing device may incorporate a display screen 706 comprising a touch screen display. The touch screen display functions to not only display information, but also to receive input from the user, including inputting text, commands, and controls.

As mentioned briefly above, a number of program modules and data files may be stored in the mass storage device 710 and RAM 714 of the computing device 700, including an operating system 718 suitable for controlling the operation of a networked desktop, laptop, tablet or server computer. The mass storage device 710 and RAM 714 may also store one or more program modules or data files. In particular, the mass storage device 710 and the RAM 714 may store the presentation program module 125. The mass storage device 710 and RAM 714 may also store theme data 725 that may be provided to the presentation program module as needed. The mass storage device may also store the slide presentation file data 724.

It should be appreciated that the software components described herein may, when loaded into the processor 702 and executed, transform the processor 702 and the overall computing device 700 from a general-purpose computing system into a special-purpose computing system customized to facilitate the functionality presented herein. The processor 702 may be constructed from any number of transistors or other discrete circuit elements, which may individually or collectively assume any number of states. More specifically, the processor 702 may operate as a finite-state machine, in response to executable instructions contained within the software modules disclosed herein. These computer-executable instructions may transform the processor 702 by specifying how the processor 702 transitions between states, thereby transforming the transistors or other discrete hardware elements constituting the processor 702.

Encoding the software modules presented herein may also transform the physical structure of the computer-readable media presented herein. The specific transformation of physical structure may depend on various factors, in different implementations of this description. Examples of such factors may include, but are not limited to the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computing device 700 in order to store and execute the software components presented herein. It also should be appreciated that the computing device 700 may comprise other types of computing devices, including hand-held computers, embedded computer systems, personal digital assistants, and other types of computing devices known to those skilled in the art. It is also contemplated that the computing device 700 may not include all of the components shown in FIG. 7, may include other components that are not explicitly shown in FIG. 7, or may utilize an architecture completely different than that shown in FIG. 7.

Based on the foregoing, it should be appreciated that various themes and theme variations can be presented to a user for incorporation into a slide presentation. The user can be presented with a theme gallery that includes various templates representing themes and theme variations. Further, each slide presentation file can include a theme family identifier, which can be used by the presentation application program when loading the slide to identify which theme family the theme variation is associated with. Further, a file structure is disclosed to ensure backwards compatibility with prior versions of the presentation program. It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A computer implemented method for processing a file comprising a slide by a presentation program comprising:
   reading, by a computing device, the file comprising the slide from a memory;
   identifying, by the computing device, a theme family identifier value stored in the file associated with the slide;
   ascertaining, by the computing device, a theme family based on the theme family identifier value, the theme family comprising a collection of themes related in a graphical manner; and
   presenting, by the computing device, a graphical user interface comprising
      a theme gallery comprising a plurality of theme templates, wherein each theme template represents a theme from the theme family, said theme comprising a combination of at least a color palette and at least one background graphic, and
      a theme variation gallery comprising a first plurality of theme variation templates, wherein each theme variation template represents a variation in the theme family, and wherein each theme template and each theme variation template being represented by a different thumbnail image, wherein a current theme template and a current theme variation template are determined based on the theme family identifier value, and wherein the current theme template and the current theme variation template are presented in the graphical user interface in the theme gallery and the theme variation gallery, respectively.

2. The computer implemented method of claim 1, wherein the current theme template and the current theme variation template are associated with the theme family.

3. The computer implemented method of claim 1, wherein the theme variation gallery comprises a theme template representing a 16:9 aspect ratio.

4. The computer implemented method of claim 1, wherein the theme variation gallery comprises a theme template representing a 4:3 aspect ratio.

5. The computer implemented method of claim 1, further comprising the operations of:
- receiving, by the computing device, first input selecting one of the plurality of theme templates as a current theme;
- receiving, by the computing device, second input after the first input selecting one of a first plurality of theme variation templates as a current theme variation;
- determining, by the computing device, the theme family identifier value associated with the current theme variation; and
- recording, by the computing device, the theme family identifier value in the slide file.

6. The computer implemented method of claim 5, further comprising:
- creating, by the computing device, a first component in the file comprising a theme indicator;
- creating, by the computing device, a second component in the file comprising variants of the theme; and
- identifying, by the computing device, a plurality of variants of the theme in the second component.

7. The computer implemented method of claim 6, wherein there are eight plurality of variants of the theme indicated in the second component.

8. The computer implemented method of claim 7, wherein the eight plurality of variants of the theme in the second component comprise a first theme variation with a 16:9 aspect ratio and a second theme variation with a 4:3 aspect ratio.

9. The computer implemented method of claim 8, wherein at least two of the eight plurality of variants referenced in the second component reference a common visual object.

10. The computer implemented method of claim 9, wherein the common visual object is stored in a third component of the file.

11. One of an optical disk, a magnetic storage device or a solid state storage device storing instructions that when executed cause a processor to:
- read a file comprising a slide of a presentation program;
- identify a theme family identifier value stored in the file associated with the slide;
- ascertain a theme family based on the theme family identifier value, the theme family comprising a collection of themes related in a graphical manner; and
- present a graphical user interface comprising
  - a theme gallery comprising a plurality of theme templates, wherein each theme template represents a theme from the theme family, said theme comprising a combination of at least a color palette and at least one background graphic, and
  - a theme variation gallery comprising a first plurality of theme variation templates, wherein each theme variation template represents a variation in the theme family, and wherein each theme template and each theme variation template being represented by a different thumbnail image, wherein a current theme template and a current theme variation template are determined based on the theme family identifier value, and wherein the current theme template and the current theme variation template are presented in the graphical user interface in the theme gallery and the theme variation gallery, respectively.

12. The optical disk, magnetic storage device or solid state storage device of claim 11, wherein the instructions further cause the processor to:
- receive first input selecting one of the plurality of theme templates as a current theme;
- receive second input after the first input selecting one of a first plurality of theme variation templates as a current theme variation;
- determine the theme family identifier value associated with the current theme variation; and
- record the theme family identifier value in the slide file.

13. The optical disk, magnetic storage device or solid state storage device of claim 12, wherein the instructions further cause the processor to:
- create a first component in the file comprising a theme indicator;
- create a second component in the file comprising variants of the theme; and
- identify a plurality of variants of the theme in the second component.

14. The optical disk, magnetic storage device or solid state storage device of claim 13, wherein there are eight variants of the theme indicated in the second component.

15. The optical disk, magnetic storage device or solid state storage device of claim 14, wherein the eight plurality of variants of the theme in the second component comprise a first theme variation with a 16:9 aspect ratio and a second theme variation with a 4:3 aspect ratio.

16. A system for presenting a slide of a presentation program comprising:
- a memory storing a file comprising the slide; and
- a processor executing instructions stored in the memory configured to
  - read the file comprising the slide of the presentation program,
  - identify a theme family identifier value stored in the file associated with the slide,
  - ascertain a theme family based on the theme family identifier value, the theme family comprising a collection of themes related in a graphical manner, and
  - present a graphical user interface comprising
    - a theme gallery comprising a plurality of theme templates, wherein each theme template represents a theme from the theme family, said theme comprising a combination of at least a color palette and at least one background graphic, and
    - a theme variation gallery comprising a first plurality of theme variation templates, wherein each theme variation template represents a variation in the theme family, and wherein each theme template and each theme variation template being represented by a different thumbnail image, wherein a current theme template and a current theme variation template are determined based on the theme family identifier, wherein the current theme template and the current theme variation template are presented in the graphical user interface in the theme gallery and the theme variation gallery, respectively, and wherein the plurality of theme variation templates comprise a first theme variation with a 16:9 aspect ratio and a second theme variation with a 4:3 aspect ratio.

17. The system of claim 16, wherein the processor executing instructions stored in the memory is further configured to:

receive first input selecting one of the plurality of theme templates as a current theme;

receive second input after the first input selecting one of a first plurality of theme variation templates as a current theme variation;

determine the theme family identifier value associated with the current theme variation; and record the theme family identifier value in the slide file.

18. The system of claim 17, wherein the processor executing instructions stored in the memory is further configured to:

create a first component in the file comprising a theme indicator;

create a second component in the file comprising variants of the theme; and identify a plurality of variants of the theme in the second component.

19. The system of claim 18, wherein there are eight variants of the theme indicated in the second component.

20. The system of claim 19, wherein at least two of the eight plurality of variants of the theme in the second component comprise a common visual object, the common visual object indicated in a third component in the file.

* * * * *